June 4, 1957 G. E. HUGHES 2,794,411
TIRE DEFLATION ALARM
Filed Sept. 12, 1955
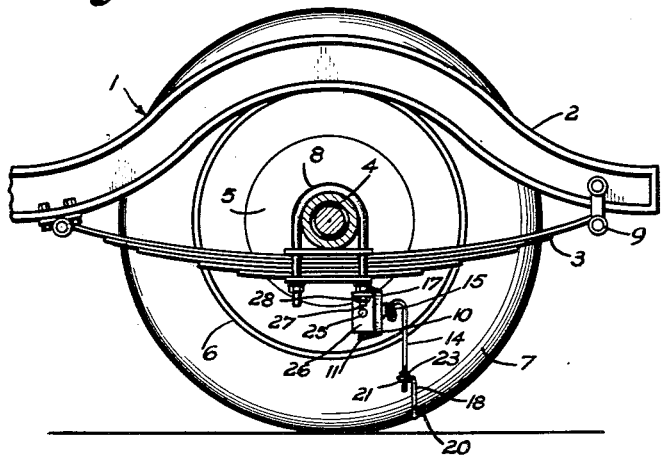
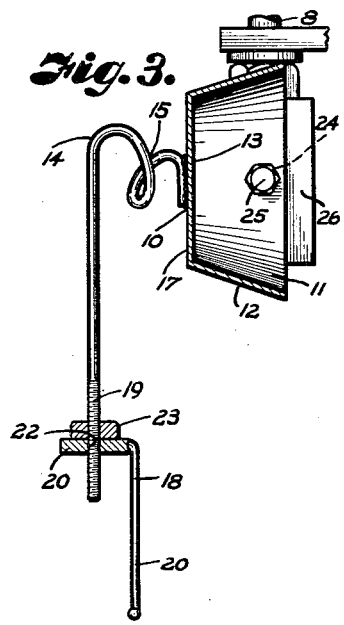
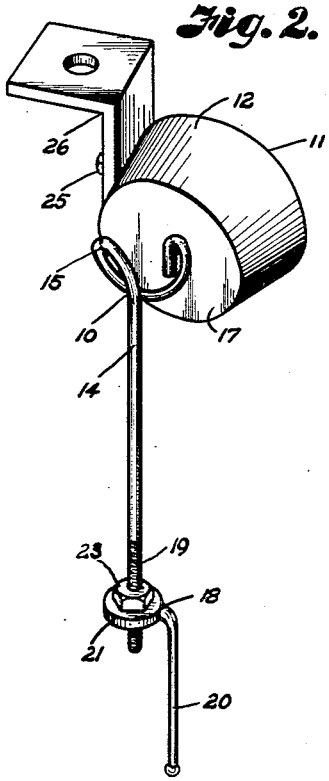
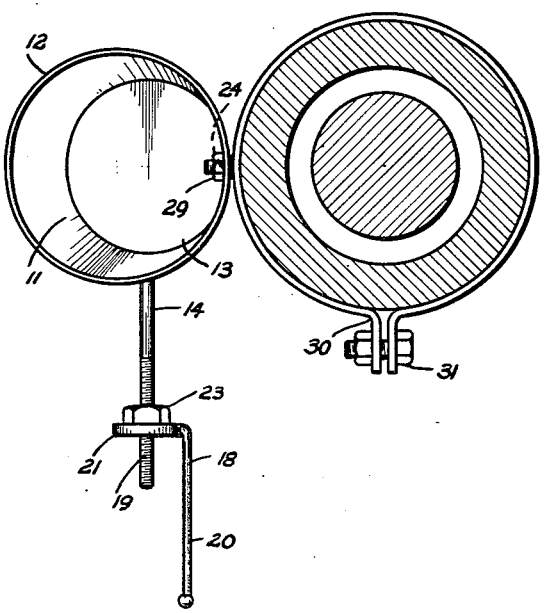
INVENTOR.
George E. Hughes.
BY
*Fishburn & Mullendore*
ATTORNEYS.

though I claim as new and desire to secure by Letters
2,794,411

TIRE DEFLATION ALARM

George E. Hughes, Huntington Park, Calif.

Application September 12, 1955, Serial No. 533,765

4 Claims. (Cl. 116—34)

This invention relates to improved alarms for use on vehicles to warn the operator that a tire is becoming under-inflated or is dangerously low, and more particularly to such an alarm device utilizing a vibratory resonant structure which upon a portion thereof striking the ground gives a signal of sufficient volume to be heard by the operator.

The objects of the present invention are to provide a vibratory resonant rod of spring metal or the like extending downwardly from a metal resonant diaphragm member secured to a vehicle part having constant relationship with the wheel axis and having a lower end adapted to strike or drag the ground when the pressure of the adjacent tire is low; to provide such a tire deflation alarm with a removable adjustable tip on the lower end of the rod; to provide an audible signal for mounting on vehicles having pneumatic tires and capable of providing an alarm signal that is audible to the operator above the usual road noises and the like; and to provide such an audible signal that is economical to manufacture, easily mounted on vehicles, adjustable for different heights of mounting and efficient in operation to provide an alarm when the pressure in the pneumatic tire is dangerously low.

In accomplishing these and other objects of the present invention, I have provided improved details of structure, the preferred forms of which are illustrated in the accompanying drawings, wherein:

Fig. 1 is an elevational view showing the alarm mounted on a vehicle.

Fig. 2 is a perspective view of the alarm.

Fig. 3 is a vertical sectional view through the alarm.

Fig. 4 is an elevation of alarm with a modified mounting structure.

Referring more in detail to the drawings:

1 designates a vehicle such as a conventional automobile structure having a frame 2, springs 3, axle 4, brake housing 5, wheel 6 and pneumatic tires 7. The spring illustrated is of the leaf type with its central portion fixed as at 8 to the axle by means of U-bolts and saddles and having its ends connected to the frame by means of customary shackle devices 9. The illustration of the vehicle is exemplary only as any alarm device may be used on any conventional vehicle structure and both at the front and rear thereof.

An alarm device 10 is mounted on the vehicle adjacent each wheel preferably in a manner and position whereby the upper portion of the alarm is maintained in constant relationship to the axis of the axle regardless of the movement of the frame or body relative thereto. The alarm device includes, a metal resonant diaphragm 11 terminating at its outer edge in a laterally directed peripheral flange 12 which preferably forms a side wall of a cup-like structure in which the walls slope outwardly from one side 13 of the diaphragm 11. A vibratory resonant rod 14 has its upper end coiled to form a spiral 15, the end 16 of which is suitably secured to the other side 17 of the diaphragm 11 preferably adjacent the center thereof. The end 16 is preferably secured to the diaphragm 11 by welding or the like, but may be secured by bolts or other suitable fastening means.

The rod 14 extends downwardly from the spiral portion 15 and has a lower end member 18 adapted to strike the ground or other surface to effect vibration and resonance of the rod 14 and diaphragm 11 when the pressure in an adjacent tire 7 is low. The end member 18 may be integral with the rod; however, it is preferred that the lower end of the rod be threaded as at 19 and that the end member 18 be replaceable thereon. The end member 18 is preferably a flat strip 20 of wear-resisting metal with a laterally turned flange 21 provided with a threaded bore 22 adapted to be screwed on the threaded end 19 of the rod 14, a lock nut 23 or the like being arranged on the rod and adapted to be engaged with the flange 21 to hold the end member or finger 18 at desired adjusted position relative to the end of the rod.

The rod 14 is preferably secured to the diaphragm 11 on the opposite side thereof from the flange 12, and the flange is preferably provided with one or more apertures 24 for receiving fastening devices 25 for securing the alarm device to a mounting bracket 26 or directly to some portion of the vehicle, for example, on the lower end of one of the spring mounting U-bolts.

In the illustrated structure, the flange 12 is secured by a fastening device 25 to an L-shaped bracket 26 which is secured to the lower end of the spring mounting U-bolt 27 by means of a suitable fastening device such as a nut 28 threaded on the lower end of the U-bolt 27.

In the form of the invention illustrated in Fig. 4, the flange 12 is secured by a fastening device 29 to a clamp 30 arranged to embrace the axle 4 and be clamped thereto by a fastening device 31. Other forms of brackets may obviously be utilized for various locations for mounting of the alarm on the vehicle.

In using a device such as constructed and described, the flange 12 of the alarm is secured to the flange of a bracket 26 and the bracket secured to a portion of the vehicle adjacent to one of the wheels and having constant relationship with the axis of the wheel as, for example, on the brake housing, axle or spring, in such a manner that the rod 14 depends therefrom. The nut 23 is threaded upwardly on the rod 14 and the finger 18 threaded on said rod until the lower end of the finger is spaced from the ground when a vehicle is in normal operating condition whereby when the adjacent tire is normally inflated, the end of the finger will be spaced from the ground. The nut 23 is then screwed into tight engagement with the flange 21 to hold the finger in selected position. When the air leaks from the tire and the tire becomes partially deflated or low, the lower end of the finger 18 will strike or drag along the ground producing a vibration in the rod 14 and diaphragm 11 providing an audible sound of sufficient volume that the operator can hear same above the normal road noises. If the operating conditions of the vehicle change, for example, the normal load carried above an axle is increased, the nut 23 is loosened and the finger 18 screwed on the lower end of the rod 14 to adjust the lower end of the finger to desired spacing from the ground under such loaded conditions. A separate and independent alarm device is placed on the vehicle adjacent each wheel, and the finger adjusted thereon whereby under-inflation of any tire will effect a suitable signal, advising the operator of the dangerous condition of under-inflation of the tire.

It is to be understood that while I have illustrated and described a form of my invention, it is not to be limited to the specific forms or arrangement of parts herein described and shown except insofar as such limitations are included in the claims.

What I claim and desire to secure by Letters Patent is:

1. In a vehicle having a frame carried on axles with pneumatic tired wheels mounted thereon, a tire deflation alarm comprising, a relatively flat metal resonant diaphragm, a resonant metal rod having a linear straight portion with one end secured in metal to metal contact to one side of the diaphragm in spaced relation to the outer edges thereof and means securing the diaphragm to the vehicle adjacent a wheel thereof and in fixed relation to the axle on which said wheel is mounted with the free end of the rod depending from the diaphragm toward the ground and the free end of said rod at a fixed spacing from the ground during normal inflation of the tire on said adjacent wheel and engaging the ground upon predetermined deflation of said tire.

2. In a vehicle having a frame carried on axles with pneumatic tired wheels mounted thereon, a tire deflation alarm comprising, a relatively flat metal resonant diaphragm terminating at its outer edge in a peripheral flange extending to one side of the diaphragm, a resonant metal rod having linear straight portion with one end secured in metal to metal contact to the other side of the diaphragm, and means securing the diaphragm and flange to the vehicle adjacent a wheel thereof and in a fixed and constant relationship to the axis of the axle on which said wheel is mounted with the free end of the rod depending therefrom toward the ground and the free end of said rod at a fixed spacing from the ground during normal inflation of the tire on said adjacent wheel and engaging the ground upon predetermined deflation of said tire.

3. In a vehicle having a frame carried on axles with pneumatic tired wheels mounted thereon, a tire deflation alarm comprising, a relatively flat metal resonant diaphragm, the resonant metal rod having a linear straight portion with one end formed in a spiral, means securing the end of the spiral portion of the rod to one side of the diaphragm in metal to metal contact spaced from the outer edge thereof, means fixed to the diaphragm and secured to the vehicle adjacent a wheel thereof and in fixed and constant relationship to the axis of the axle on which said wheel is mounted whereby the free end of the rod depends from the diaphragm toward the ground, an elongated finger with one end portion removably mounted on the rod and selectively movable thereon whereby the finger is adjustable on the rod with the other end portion of said finger extending from the rod toward the ground, and means securing the finger on the rod in adjusted position whereby the free end of said finger is at a fixed spacing from the ground during normal inflation of the tire on said adjacent wheel and engages the ground upon predetermined deflation of said tire.

4. In a vehicle having a frame carried on axles with pneumatic tired wheels mounted thereon, a tire deflation alarm comprising, a relatively flat metal resonant diaphragm, a peripheral flange on the diaphragm and extending to one side thereof, the resonant metal rod having a linear straight portion with one end formed in a spiral, means securing the end of the spiral portion of the rod to the other side of the diaphragm in metal to metal contact and spaced from the outer edge thereof, a bracket fixed on the diaphragm flange in spaced relation to the diaphragm and secured to the vehicle adjacent a wheel thereof in fixed and constant relation to the axis of the axle on which said wheel is mounted whereby the free end of the rod depends from the diaphragm toward the ground, screw threads on the rod adjacent the free end thereof, an elongated finger having a lateral flange with a threaded aperture therein threaded on the free end of the rod whereby the finger is adjustable on the rod and extends therefrom toward the ground, and means securing the finger on the rod in adjusted position whereby the free end of said finger is at a fixed spacing from the ground during normal inflation of the tire on said adjacent wheel and engages the ground upon predetermined deflation of said tire.

References Cited in the file of this patent

UNITED STATES PATENTS

| | | |
|---|---|---|
| 1,843,259 | Young | Feb. 2, 1932 |
| 2,281,806 | Schulman | May 5, 1942 |
| 2,686,493 | Neiswanger | Aug. 17, 1954 |